United States Patent [19]
Park et al.

[11] Patent Number: 5,481,304
[45] Date of Patent: Jan. 2, 1996

[54] APPARATUS FOR ZOOMING A DIGITAL VIDEO SIGNAL OF A PREDETERMINED COLOR ORDER WHICH IS DERIVED FROM A CHARGE-COUPLED DEVICE

[75] Inventors: Sung-wook Park, Incheon; Joon-ki Paik, Seoul, both of Rep. of Korea

[73] Assignee: Samsung Electronics Co., Ltd., Suwon, Rep. of Korea

[21] Appl. No.: 363,988

[22] Filed: Dec. 27, 1994

Related U.S. Application Data

[63] Continuation-in-part of Ser. No. 127,065, Sep. 27, 1993, abandoned.

[30] Foreign Application Priority Data

Sep. 25, 1992 [KR] Rep. of Korea ............... 92-17558

[51] Int. Cl.[6] ............................. H04N 9/04; H04N 5/14
[52] U.S. Cl. ............................. 348/240; 348/561
[58] Field of Search ................. ; 348/553, 561, 348/562, 580, 581, 240, 582; H04N 1/387, 3/22, 3/223, 5/14, 9/74, 9/04

[56] References Cited

U.S. PATENT DOCUMENTS

| | | | |
|---|---|---|---|
| 4,286,291 | 8/1981 | Taylor et al. | 348/397 |
| 4,528,585 | 7/1985 | Bolger | 348/580 |
| 4,660,081 | 4/1987 | Heerah | 348/580 |
| 4,774,581 | 9/1988 | Shiratsuchi | 348/561 |
| 4,792,856 | 12/1988 | Shiratsuchi | 348/561 |
| 4,814,860 | 3/1989 | Shiratsuchi | 348/562 |
| 4,951,125 | 8/1990 | Kojima et al. | 348/561 |
| 4,991,022 | 2/1991 | Canfield et al. | 348/561 |
| 5,083,208 | 1/1992 | Hitanaka | 348/240 |
| 5,333,055 | 7/1994 | Murata et al. | 348/240 X |

*Primary Examiner*—Victor R. Kostak
*Assistant Examiner*—John W. Miller
*Attorney, Agent, or Firm*—Cushman, Darby & Cushman

[57] ABSTRACT

A digital zooming system comprises a recording medium for saving a digital video signal forming a predetermined color array; a sum/difference signal separator for receiving the signal from the recording medium and then obtaining a sum value and difference value with respect to two neighboring pixels among the pixels of the predetermined color array; a correlation calculating circuit comprising a sum-value interpolation calculator for performing horizontal and vertical interpolations with respect to the sum-value according to a zooming ratio and a difference-value interpolation calculator for calculating the horizontal and vertical interpolations; a sum/difference signal mixer for receiving the interpolated sum value and difference value and producing the original digital video signal; a digital-to-analog converter for converting the digital video signal from the mixer into analog form; an address generator circuit for generating an address signal for reading or writing the data recorded on the recording medium; a coefficient generator for inputting coefficients conforming to the zooming ratio to the sum-value and difference-value interpolation calculators; and a control-signal generator for generating control signals for controlling the system. Therefore, the system can be applied for a variety of magnifying factors and a high quality digital picture zoom is accomplished.

15 Claims, 10 Drawing Sheets

APPARATUS FOR ZOOMING A DIGITAL VIDEO SIGNAL OF A PREDETERMINED COLOR ORDER WHICH IS DERIVED FROM A CHARGE-COUPLED DEVICE

This is a continuation-in-part of application Ser. No. 8/127,065, filed on Sep. 27, 1993, which was abandoned upon the filing hereof.

BACKGROUND OF THE INVENTION

The present invention relates to a digital zooming system, and more particularly to a digital zooming system adopting a digital zooming method using a video signal from a charge-coupled device.

Hereinafter, conventional digital zooming systems will be explained.

In U.S. Pat. No. 4,528,585, a television receiver having a picture magnifying apparatus employs a fixed magnification factor. Also, a variable magnification factor is realized in a digital still picture storage system with a size change facility as disclosed in U.S. Pat. No. 4,302,776, but in this instance, real-time processing is impossible. Further, a television picture zoom system disclosed in U.S. Pat. No. 4,774,581 achieves both variable magnification and real-time processing, but its application field is restricted to the composite video signal processing of a television.

SUMMARY OF THE INVENTION

An object of the present invention is to provide a digital zooming system which is applicable to various magnification factors.

Another object of the present invention is to provide a digital zooming system which can perform real-time processing.

Another object of the present invention is to provide a digital zooming system which is can be applied to a wide variety of fields.

A digital zooming system according to the present invention, for accomplishing the aforementioned objects, comprises a recording medium for saving a digital video signal having a predetermined color array; sum/difference signal separating means for receiving the signal from the recording medium and then obtaining a sum value and difference value with respect to two neighboring pixels among the pixels of the predetermined color array, the sum value obtained by summing the values of the two neighboring pixels with a difference value representing the difference thereof; correlation calculating means comprising sum-value interpolation calculating means for performing horizontal and vertical interpolations with respect to the summed value of the two neighboring pixels according to the zooming ratio and difference-value interpolation calculating means for calculating the horizontal and vertical interpolations with respect to the difference value between the two neighboring pixels according to the zooming ratio; sum/difference signal mixing means for receiving the interpolated sum and difference values from the sum-value and difference-value interpolation calculating means and producing the original digital video signal; digital-to-analog converting means for converting the digital video signal from the mixing means into analog form; address generating means for generating an address signal for reading or writing the data recorded on the recording means; coefficient generating means for inputting coefficients corresponding to the zooming ratio to the interpolation calculating means; and control-signal generating means for generating a control signal for controlling each of the above means.

According to prior art, a television signal which is obtained by frequency-modulating a luminance signal and chrominance signal is used for performing a digital zooming system.

According to the present invention, a charge-coupled device signal supplied from a pickup device in a video camera is directly used therefore. Accordingly, such a digitized and zoomed signal is converted into an original charge-coupled device signal format performed in a sum/difference signal mixing means 11 shown in FIG. 1. Therefore, according to the present invention, a charge-coupled device signal is not converted into a television signal such as luminance and chrominance signals, but is directly interpolated. Thereafter, the interpolated signal is converted into a television signal for recordation on a viewfinder or a VTR.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Prior to describing the digital zooming system according to the present invention with the attached drawings, the algorithm thereof is explained hereinafter.

In general, a single-plate charge-coupled device produces a video signal having different complementary color components due to a complementary color filter, as follows:

| S1 | S2 | S3 | S4 | S5 | S6 | S7 | ... |
|----|----|----|----|----|----|----|-----|
| Cy | Ye | Cy | Ye | Cy | Ye | Cy | ... |
| G  | Mg | G  | Mg | G  | Mg | G  | ... |
| Cy | Ye | Cy | Ye | Cy | Ye | Cy | ... |
| Mg | G  | Mg | G  | Mg | G  | Mg | ... |
| Cy | Ye | Cy | Ye | Cy | Ye | Cy | ... |
| .  | .  | .  | .  | .  | .  | .  |     |
| .  | .  | .  | .  | .  | .  | .  |     |
| .  | .  | .  | .  | .  | .  | .  |     |

In accordance with the array, the color signal for the even field is output in a sequence of S1 of the summation of Cy (cyan) and G (green), S2 of the summation of Ye (yellow) and Mg (magenta), etc., and the color signal for the odd field is output in a sequence of S1 of summation of Cy and Mg, S2 of summation of Ye and G, etc. The sum value Y and difference value D of the signals S1 and S2 are defined as:

$$Y1 = S1 + S2 \quad (1)$$
$$= Cy + G + Ye + Mg$$
$$D = S2 - S1 \quad (2)$$
$$= Ye + Mg - Cy - G$$
$$D = S2 - S1 \quad (3)$$
$$= Ye + G - Mg - Cy$$

At this time, Equations 2 and 3 show the even and odd horizontal lines, respectively. The sum value and difference value are interpolated in the vertical and horizontal directions according to the zooming ratio.

The vertical and horizontal interpolations for the sum value adopt a bilinear interpolation method, the horizontal interpolation for the difference value is performed by the bilinear interpolation method, and the vertical interpolation therefor adopts a nearest-neighbor interpolation (NNI) method. For sum-value interpolation, a sum value of a pixel is in correlation with neighboring pixel data in the horizontal and vertical directions. Accordingly, sum-value interpolation uses the bilinear interpolation method. For difference value interpolation, the difference value is not in correlation with the neighboring column pixel data, but instead can be interpolated with the pixel data of the next. Accordingly, difference-value vertical interpolation uses the NNI method.

The interpolation method wherein the value of a point X between two pixels A and B are calculated to interpolate its position, will be explained.

The distance between pixel A and the point X is denoted as $\alpha$, the distance between pixels A and B is set to one, and the distance between pixel B and point X is denoted as $\beta$. Accordingly, $\beta$ equals $1-\alpha$, and when using $\alpha$ and $\beta$ to express these distances, the interpolation value of X becomes $\beta A + \alpha B$.

Here, the horizontal interpolation of the difference value produces a signal degradation near the edge portion, so that a digital low-pass filter is used to compensate for the degradation. The digital low-pass filter used in the present invention has the following characteristics.

$$H(z) = \frac{0.75 + 0.5z^{-1} + 0.75z^{-2}}{2} \quad (4)$$

The interpolation results with respect to the sum value and difference value are denoted as Y" and D", respectively. The original signals S1 and S2 are obtained by the use of the interpolation results.

$$\frac{Y'' - D}{2} = \frac{(Ye + Mg + Cy + G) - (Ye + Mg - Cy - G)}{2} \quad (5)$$
$$= Cy + G$$
$$= S1$$

$$\frac{Y'' + D}{2} = \frac{(Ye + Mg + Cy + G) + (Ye + G - Cy - G)}{2} \quad (6)$$
$$= Ye + Mg$$
$$= S2$$

$$\frac{Y'' - D}{2} = \frac{(Ye + Mg + Cy + G) - (Ye + G + Mg - Cy)}{2} \quad (7)$$
$$= Cy + Mg$$
$$= S1$$

$$\frac{Y'' + D}{2} = \frac{(Ye + Mg + Cy + G) + (Ye + G - Cy - Mg)}{2} \quad (8)$$
$$= Ye + G$$
$$= S2$$

By the use of the above equations 5, 6, 7 and 8, the interpolated results Y" and D" produce the magnified signals S1 and S2.

The digital zooming system according to the present invention for performing the aforementioned algorithm will be hereinafter explained.

Figure 1:
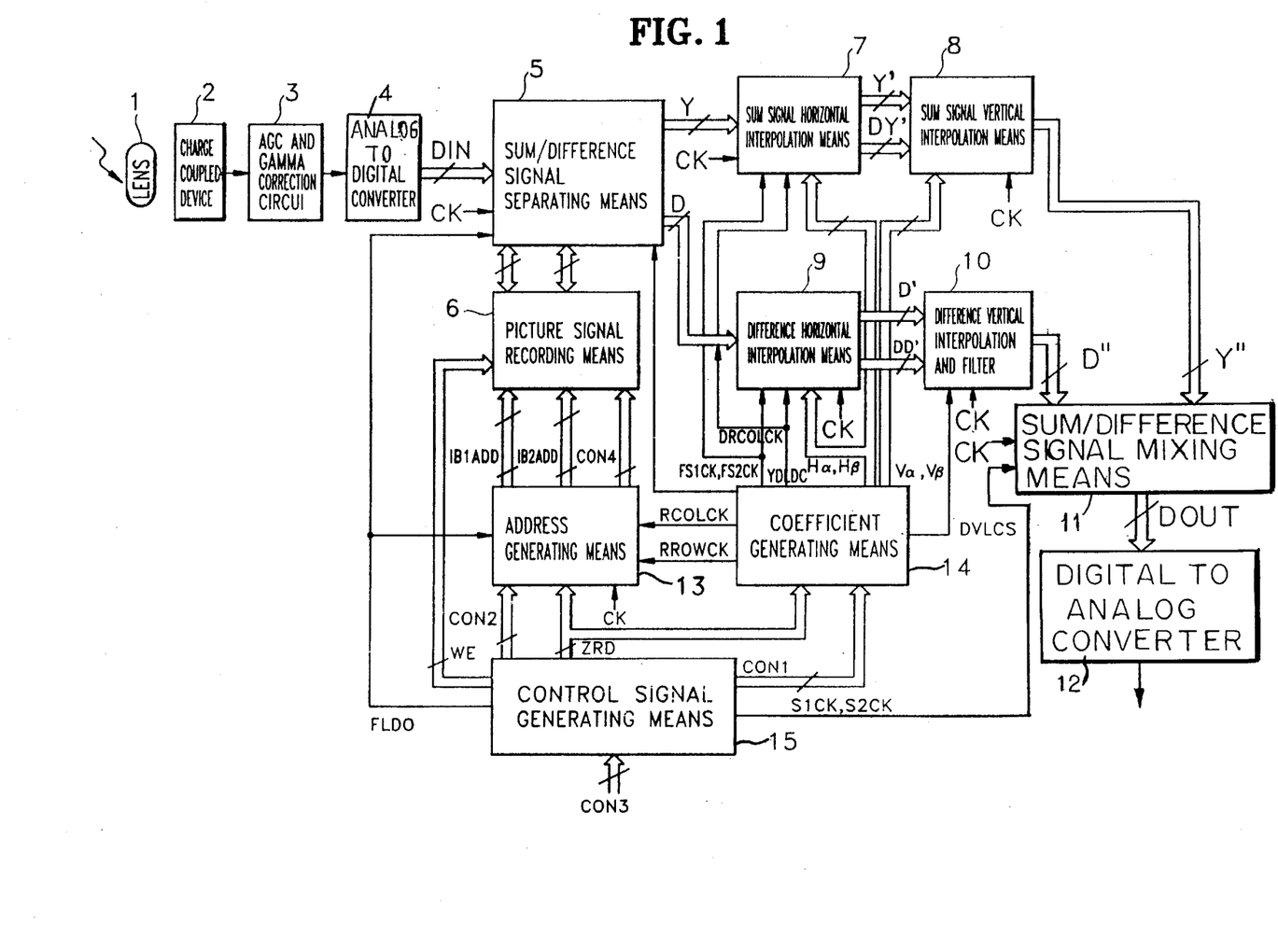
FIG. 1 is a block diagram showing a digital zooming system according to the present invention.

FIG. 1 shows a block diagram of the digital zooming system according to the present invention.

Relating to FIG. 1, the incident light via a lens 1 is converted into an electrical signal by a charge-coupled device 2. The signal is processed through an automatic gain controller (AGC) and gamma correction circuit 3. The analog signal output from the AGC and gamma correction circuit 3 is converted into digital form by an analog-to-digital converting circuit 4. The converted digital video signal is recorded on video signal recording means 6 via sum/difference signal separation means 5. From the signal, a sum signal Y and a difference signal D are obtained by the sum/difference signal separating means 5. The sum signal Y is horizontally interpolated by a sum-value horizontal interpolation circuit 7, so as to produce interpolation result Y' and a one-horizontal-line-delayed interpolation result DY'. The interpolation results Y' and DY' are vertically interpolated by a sum-value vertical interpolation circuit 8 so as to produce the final sum-value interpolation result Y". The difference signal D is horizontally interpolated by the difference-value interpolation circuit 9, so as to produce an interpolation result D' and a one-horizontal-line-delayed interpolation result DD'. The interpolation results D' and D' are vertically interpolated and filtered by a difference-value vertical interpolation circuit and filter 10 so as to produce the final interpolation result D". The finally interpolated results Y" and D" are processed by sum/difference signal mixing means 11 so as to produce a magnified digital video signal which is then converted into analog form by a digital-to-analog converter 12. Address generating means 13 produces address IB1ADD and IB2ADD and control signal CON4 for recording and reading-out the data of video signal recording means 6. According to the zooming ratio, coefficient generating means 14 produces signals RCOLCK and RROWCK for controlling the address generation of address generating means 13, and coefficients Hα and Hβ and clock signals DRCOLCK, FS1CK and FS2CK for sum-value horizontal interpolation means 7 and difference-value horizontal interpolation means 9. Coefficient generating means 14 also provides sum-value vertical interpolation means 8 with coefficients Vα and Vβ according to the zooming ratio, and provides difference-value vertical interpolation means and filter 10 with a control signal DVLCS. The control-signal generating means 15 receives control signal CON3 and thus produces control signals for controlling each of the aforementioned means. That is, control-signal generating means 15 produces field output signal FLD0 for controlling sum/difference signal separating means 5 and address generating means 13, write-enable signals WE1 and WE2 for enabling the data recording of video signal recording means 6, a control signal CON2 for controlling the address generating means 13, and data ZRD conforming to the zooming ratio. Control-signal generating means 15 also provides the coefficient generating means 14 with the zoom-ratio data and the control signal CON1, and provides the sum/difference signal mixing means 11 with the control signals S1CK and S2CK. Signals DHD and DVD (FIG. 8) are indicated by the first control signal CON1, signals WHR, WVR, DHD and DVD (FIG. 8) are indicated by the second control signal CON2, and signals CK, HD, VD, FLD0 and ZRD (FIG. 1) are indicated by the third control signal CON3.

Figure 2:
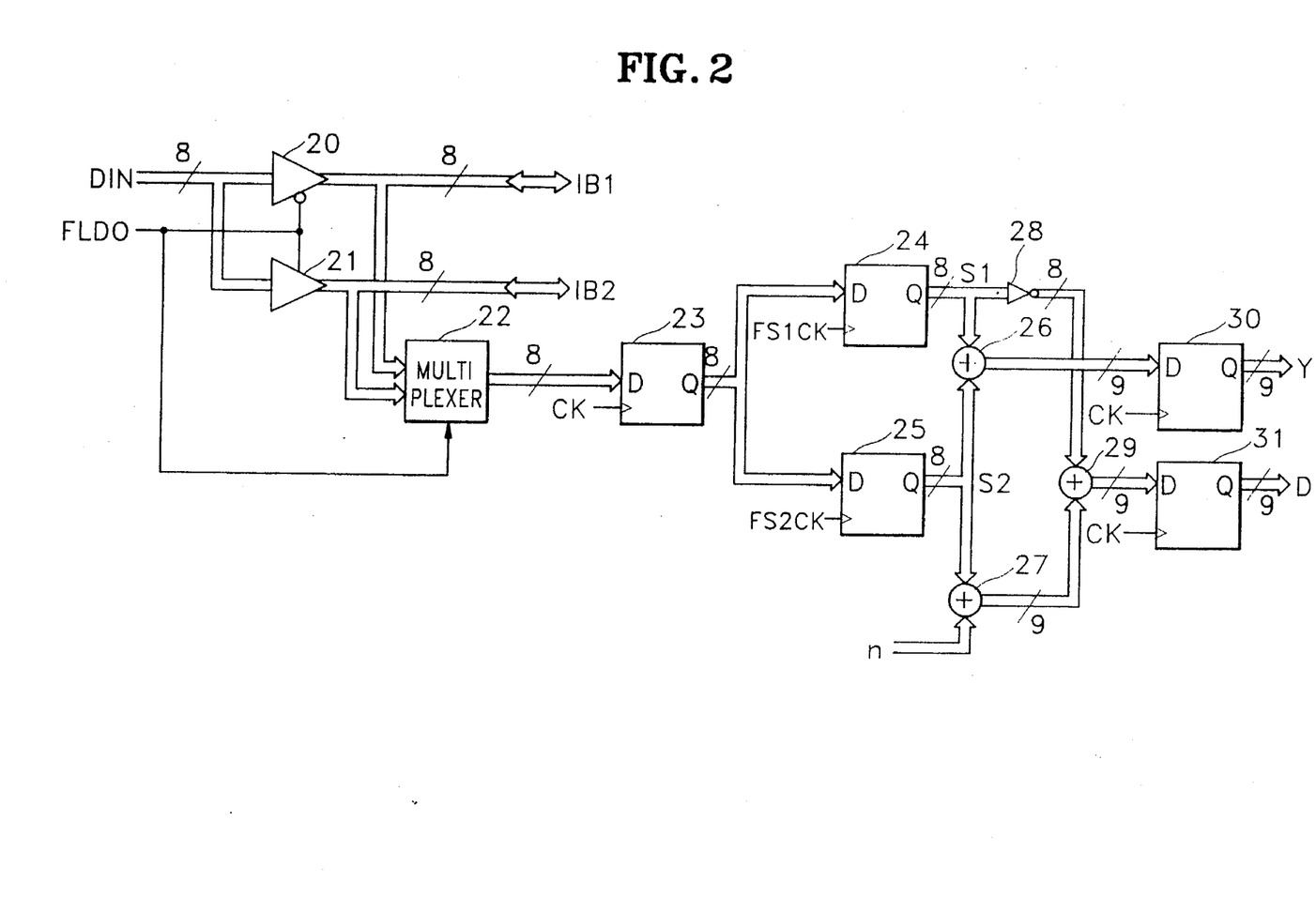
FIG. 2 is a block diagram illustrating an embodiment of the sum/difference signal separating means shown in FIG. 1.

FIG. 2 is a block diagram illustrating the sum/difference signal separating means 5 of an embodiment according to the present invention.

In FIG. 2, the sum/difference signal separating means 5 comprises a buffer 20 for outputting the digital video signal DIN to the first video signal recording means (not shown) of video signal recording means 6 (FIG. 1) by responding to the low level of the field output signal FLD0, another buffer 21 for outputting digital video signal DIN to the second video signal recording means (not shown) of video signal recording means 6 (FIG. 1) by responding to the high level of field output signal FLD0, a multiplexer 22 for alternately producing the output signal from video signal recording means 6 while responding to field output signal FLD0, D flip-flop 23 for synchronizing the output signal of multiplexer 22 by responding to the system clock CK, another D flip-flop 24 for alternately receiving signal S1 among the signals from D flip-flop 23 while responding to the signal FS1CK, another flip-flop 25 for alternately receiving signal S2 among the signals from D flip-flop 23, an adder 26 for summing the output signals of D flip-flop 24 and D flip-flop 25, another adder 27 for adding a predetermined value n to the output signal of D flip-flop 25, inverting means 28 for inverting the output signal of D flip-flop 24, another adder 29 for summing the output signals of inverting means 28 and adder 27, D flip-flop 30 for synchronizing the output signal of adder 26 by responding to clock signal CK, and D flip-flop 31 for synchronizing the output signal of adder 29 by responding to clock signal CK. Sum signal Y and difference signal D are output from D flip-flops 30 and 31, respectively.

Figure 3:
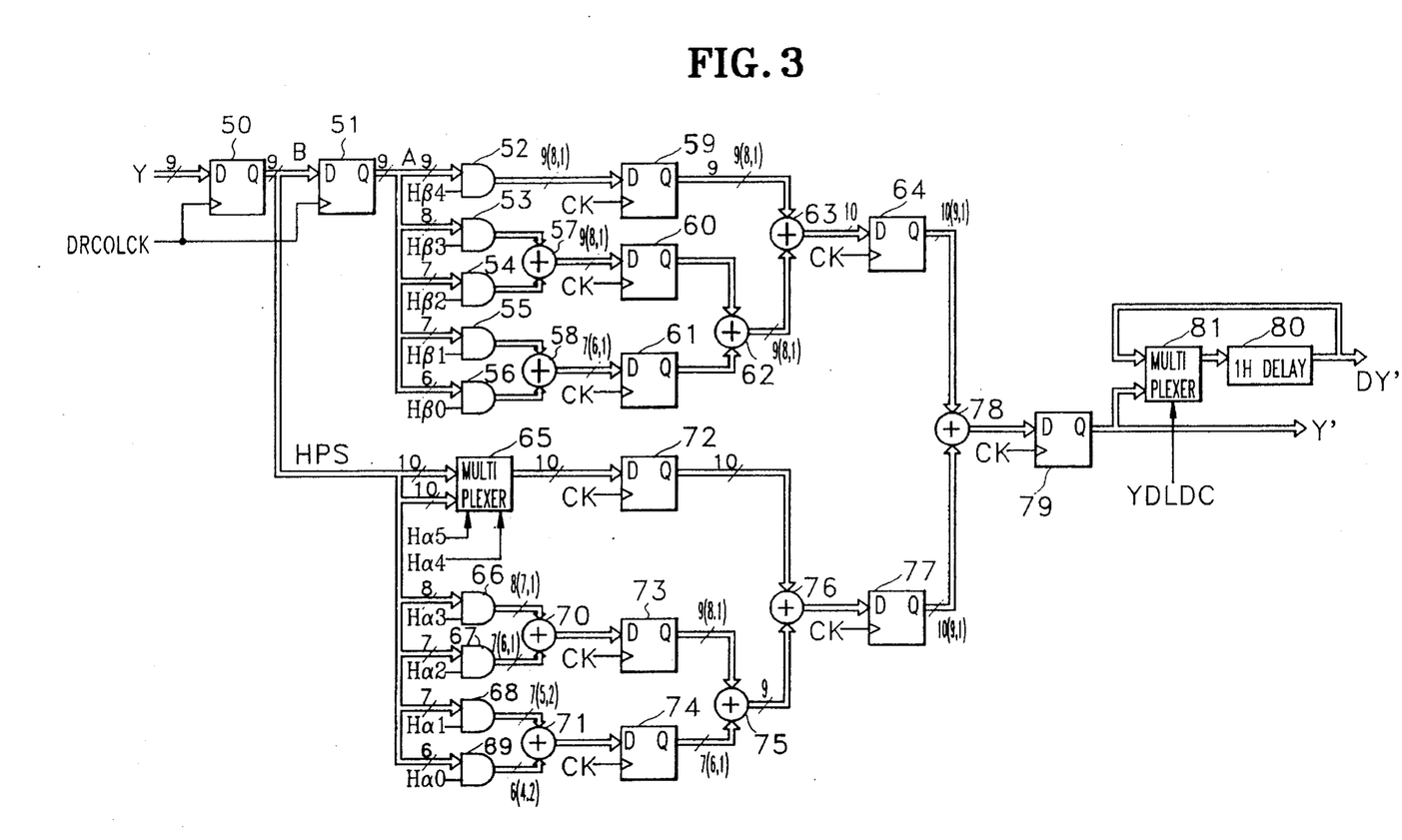
FIG. 3 is a block diagram illustrating an embodiment of the sum-value horizontal interpolation means shown in FIG. 1.

FIG. 3 shows a sum-value horizontal interpolation circuit 7 according to the embodiment shown in FIG. 1.

Relating to FIG. 3, the sum-value horizontal interpolation circuit 7 comprises series-connected D flip-flops 50 and 51 for synchronizing the sum signal Y while responding to the delayed read line address clock DRCOLCK; AND gate means 52–56 for logically multiplying the output signal of D flip-flop 51 by data Hβ4-Hβ0 which corresponds to the zooming ratio; an adder 57 for receiving and adding the output signals of AND gate means 53 and 54; an adder 58 for receiving and summing the output signals of AND gate means 55 and 56; a D flip-flop 59 for synchronizing the output signal of AND gate means 52 by responding to the clock signal CK; a D flip-flop 60 for synchronizing the output signal of adder 57 by responding to clock signal CK; a D flip-flop 61 for synchronizing the output signal of adder 58 by responding to clock signal CK; an adder 62 for summing the output signals of D flip-flops 60 and 61; an adder 63 for receiving and summing the output signals of D flip-flop 59 and adder 62; D flip-flop 64 for synchronizing the output signal of adder 63 by responding to clock signal CK; a multiplexer 65 for multiplexing the signal from D flip-flop 50 by responding to coefficients Hα5 and Hα4; AND gate means 66, 67, 68 and 69 for receiving the output signal from D flip-flop 50 and coefficients Hα3, Hα2, Hα1 and Hα0 and logically multiplying the output signal by each coefficient; an adder 70 for summing the output signals of AND gate means 66 and 67; an adder 71 for summing the output signals of AND gate means 68 and 69; a D flip-flop 72 for synchronizing the output signal of multiplexer 65 by responding to clock signal CK; a D flip-flop 73 for synchronizing the output signal of adder 70; a D flip-flop 74 for synchronizing the output signal of adder 71; an adder 75 for summing the output signals of D flip-flops 73 and 74; an adder 76 for summing the output signals of D flip-flop 72 and adder 75; D flip-flop 77 for synchronizing the output signal of adder 76 by responding to clock signal CK; an adder 78 for summing the output signals of D flip-flops 64 and 77; D flip-flop 79 for interpolating the output signal of adder 78 in the horizontal direction, to thereby produce a signal Y', delay means 80 for delaying the output signal of D flip-flop 79 for one-horizontal-scanning period and generating a delayed interpolation signal DY'; and a multiplexer 81 for selectively producing the output signal of delay means 80 or the output signal of D flip-flop 79 by responding to control signal YDLDC.

As in the above structure, D flip-flops 51, 59, 60, 61 and 64, AND gate means 52, 53, 54, 55 and 56, and adders 57, 58, 62 and 63 constitute means for multiplying the value of the first among two pixels, by the distance between any point and the first pixel. D flip-flops 50, 72, 73, 74 and 77, multiplexer 65, adders 70, 71, 75 and 76 and AND gate means 66, 67, 68 and 69 constitute means for multiplying the value of the second pixel by the distance between any point and the second pixel. Adder 78 and D flip-flop 79 are means for summing the above-calculated two products. Multiplexer 81 and delay 80 for delaying a horizontal line are for maintaining the required line for the sum-value vertical interpolation, and for maintaining a one line delay as the zooming ratio increases over several lines.

Figure 4:
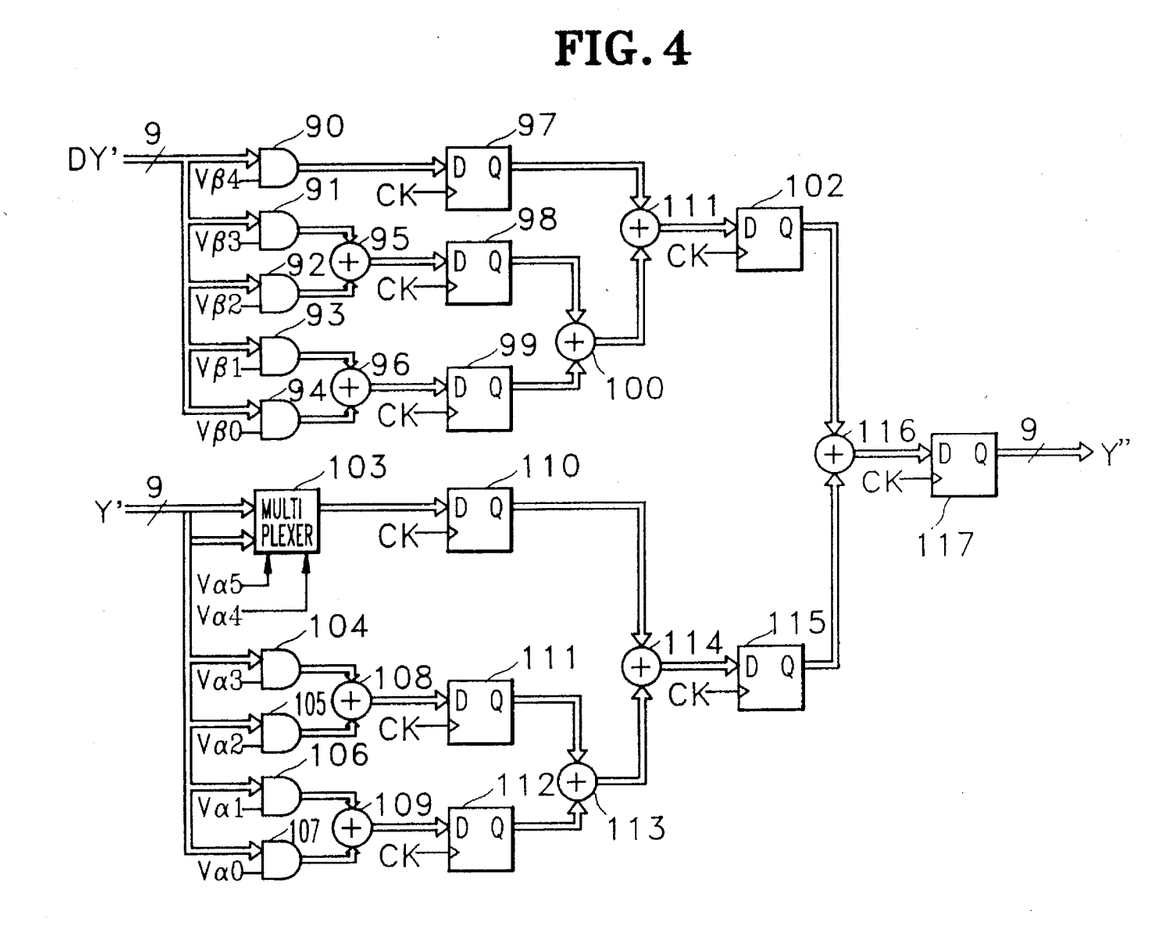
FIG. 4 is a block diagram illustrating an embodiment of the sum-value vertical interpolation means shown in FIG. 1.

FIG. 4 shows an embodiment of the sum-value vertical interpolation means 8 shown in FIG. 1.

Relating to FIG. 4, AND gate means 90, 91, 92, 93 and 94, adders 95, 96, 100 and 111, and D flip-flops 97, 98, 99 and 102 are means for receiving and multiplying the output signal DY' of the sum-value horizontal interpolation means 7 (FIG. 1) by coefficients Vβ4, Vβ3, Vβ2, Vβ1 and Vβ0 from coefficient generating means 14 (FIG. 1) which are distances to any point X corresponding to the zooming ratio. Multiplexer 103, AND gate means 104, 105, 106 and 107, adders 108, 109, 113 and 114, and D flip-flops 110, 111, 112 and 115 are means for receiving and multiplying the output signal Y' of the sum-value horizontal interpolation means 7 by coefficients Vα5, Vα4, Vα3, Vα2, Vα1 and Vα0 from coefficients generating means 14 which are also distances to any point X corresponding to the zooming ratio. Adder 116 and D flip-flop 117 are means for summing the above multiplied two numbers so as to produce the finally obtained sum-value interpolation result Y".

Figure 5:
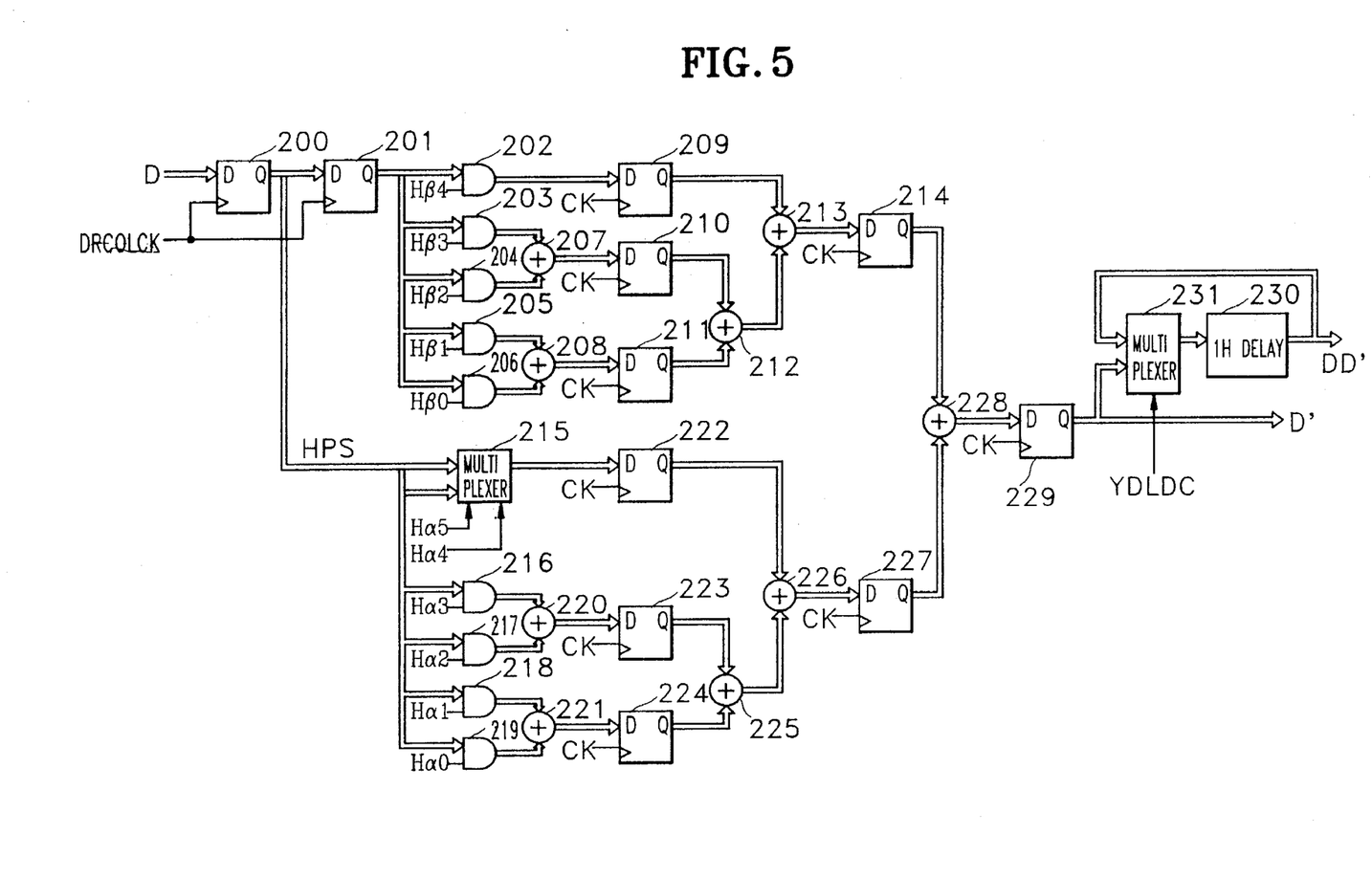
FIG. 5 is a block diagram illustrating an embodiment of the difference-value horizontal interpolation means shown in FIG. 1.

FIG. 5 is a diagram showing an embodiment of the difference-value horizontal interpolation means 9 as shown in FIG. 1.

Relating to FIG. 5, the difference-value horizontal interpolation means 9 is constituted the same as that of the sum-value horizontal interpolation means 7 (FIG. 3) save for receiving difference signal D instead of the sum signal Y. Here, the reference numerals are denoted differently.

Figure 6:
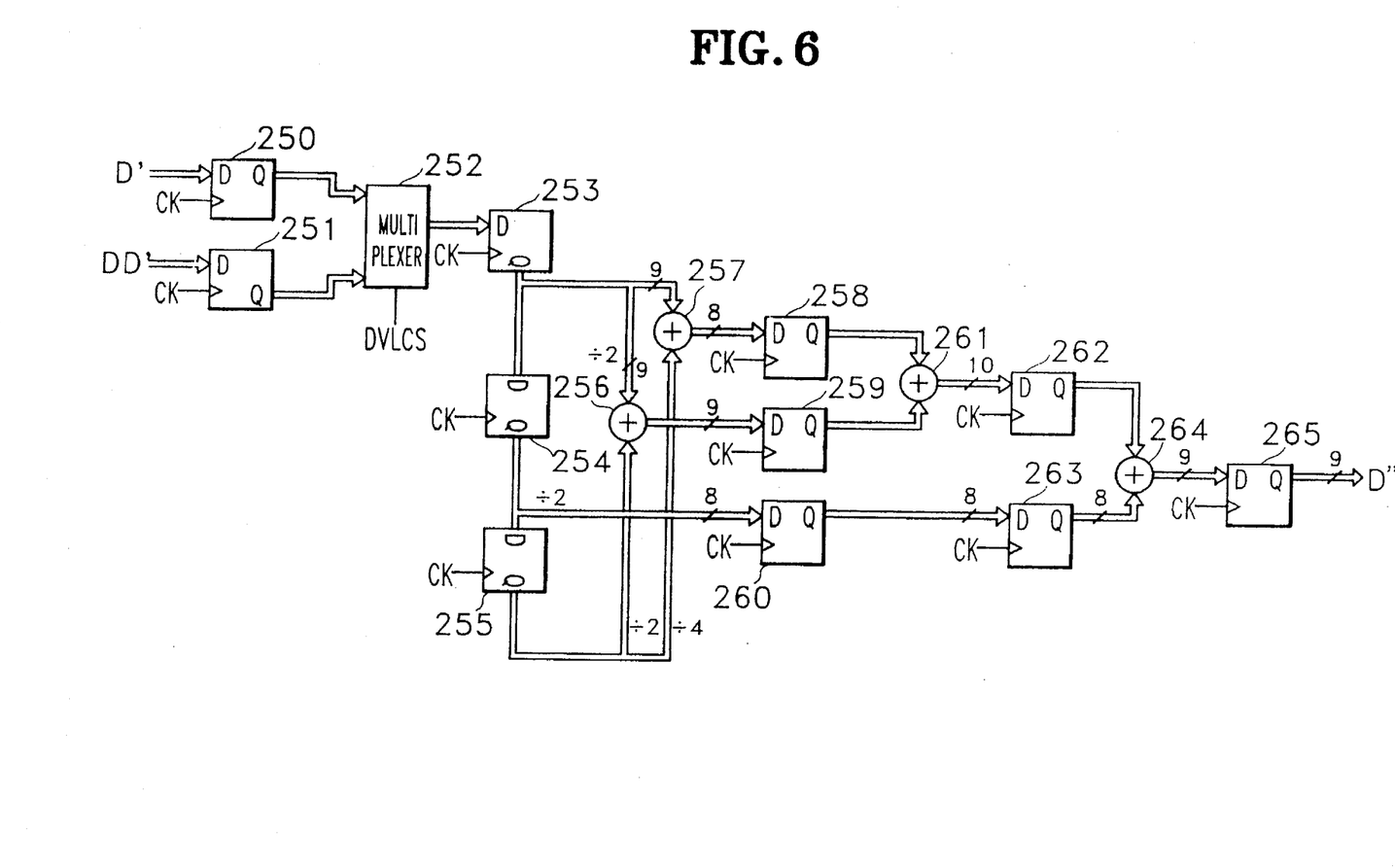
FIG. 6 is a block diagram illustrating an embodiment of the difference-value vertical interpolation and the filter shown in FIG. 1.

FIG. 6 is a diagram showing the structure of the difference value vertical interpolation means and filter of FIG. 1.

Relating to FIG. 6, the difference value vertical interpolation means and filter comprises a D flip-flop 250 for synchronizing the output signal D' of difference-value horizontal interpolation means 9 (FIG. 1) by responding to the clock signal CK; a D flip-flop 251 for synchronizing one-horizontal-line-delayed output signal DD' of difference-value horizontal interpolation means 9 (FIG. 1) by responding to clock signal CK; and a multiplexer 252 for alternately producing the output signals of D flip-flops 250 and 251 by responding to control signal DVLCS, thereby constituting means for performing the NNI operation. Also, the sum-value vertical interpolation means and filter comprises a D flip-flop 253 for synchronizing the output signal of multiplexer 252 by responding to clock signal CK; a D flip-flop 254 for synchronizing the output signal of D flip-flop 253; a D flip-flop 255 for synchronizing the output signal of D flip-flop 254; an adder 256 for adding the divided-by-two output signal of D flip-flop 253 to the divided-by-two output signal of D flip-flop 255; an adder 257 for adding the divided-by-four output signal of D flip-flop 253 to the divided-by-four output signal of D flip-flop 255; a D flip-flop 258 for synchronizing the output signal of adder 257 by responding to clock signal CK; a D flip-flop 259 for synchronizing the output signal of adder 256; a D flip-flop 260 for recording and producing the divided-by-two output signal of D flip-flop 254 by responding to clock signal CK; an adder 261 for summing the output signals of D flip-flops 258 and 259; D flip-flop 262 for synchronizing the output signal of adder 261 by responding to clock signal CK; D flip-flop 263 for synchronizing the output signal of adder 261 by responding to clock signal CK; an adder 264 for summing the output signals of D flip-flops 262 and 263; and a D flip-flop 265 for recording the output signal of adder 264 and producing the finally obtained difference-value interpolation result D", thereby constituting digital filter means for removing the noise component which takes place in the difference-value horizontal interpolation.

Here, the digital filtering means has characteristics in accordance with the above Equation 4.

Figure 7:
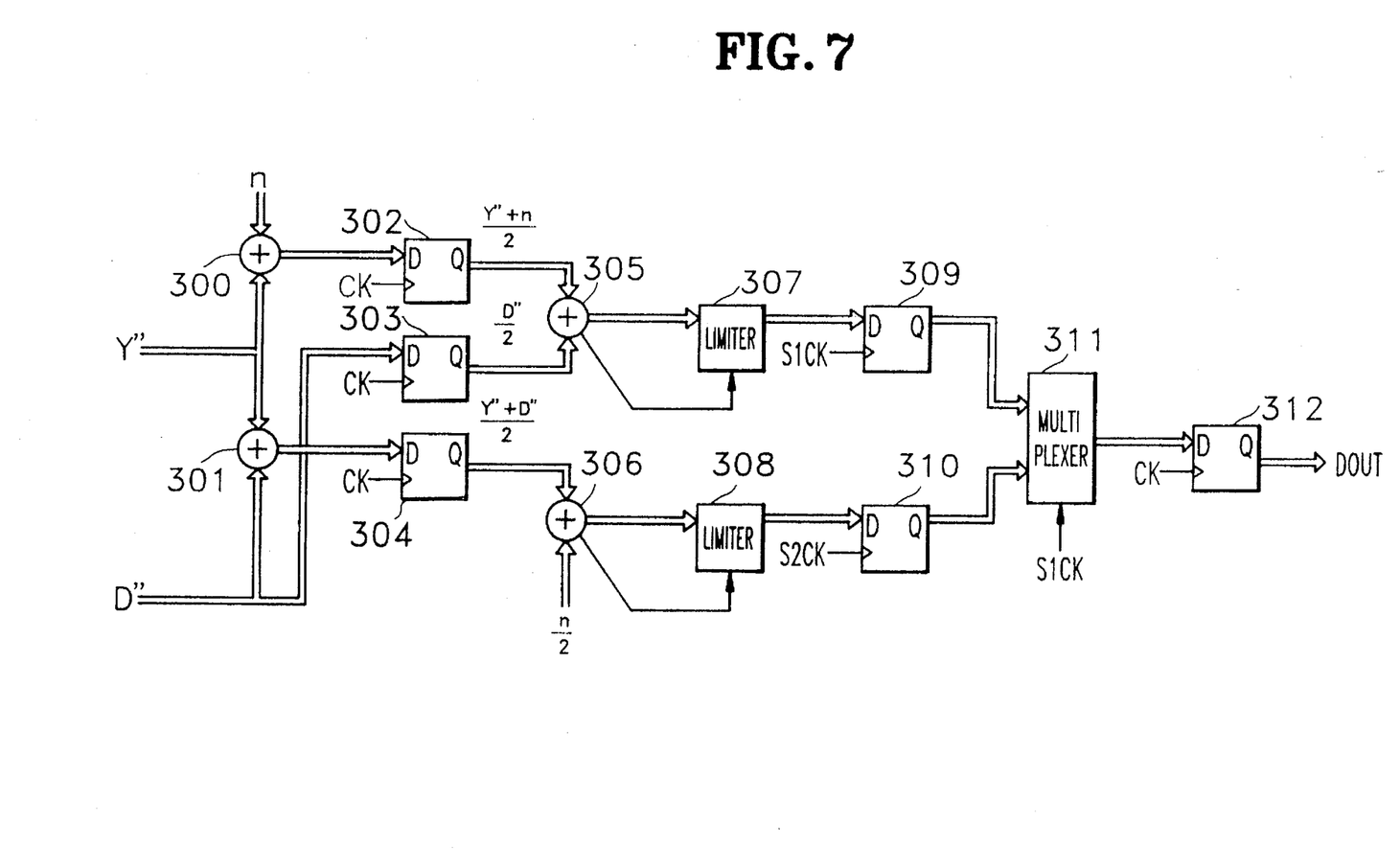
FIG. 7 is a block diagram illustrating an embodiment of the sum/difference signal mixing means as shown in FIG. 1.

FIG. 7 shows a structure of a sum/difference signal mixing means 11 shown in FIG. 1. Relating to FIG. 7, the sum/difference signal mixing mean 11 comprises an adder 300 for adding the output signal Y" of the sum-value vertical interpolation means 8 (FIG. 1) to a predetermined number n; an adder 301 for receiving and summing the output signals Y" and D" from the sum-value vertical interpolation means 8 and the difference-value vertical interpolation means and filter 10 (FIG. 1); a D flip-flop 302 for recording and producing the output signal of adder 300 by responding to clock signal CK; a D flip-flop 303 for receiving and producing the output signal D" of the difference-value vertical interpolation means and filter 10 (FIG. 1) by responding to the clock signal; a flip-flop 304 for recording and producing the output signal of adder 301 by responding to clock signal CK; an adder 305 for receiving and adding the divided-by-two output signal Y of D flip-flop 302 to the divided-by-two output signal D" of D flip-flop 303; an adder 306 for receiving and adding the divided-by-two output signal Y"+D" of D flip-flop 304 and the predetermined number divided by two; a limiter 307 for producing a limiting value when the output signal of adder 305 is larger than the limiting value; a limiter 308 for producing a limiting value when the output signal of adder 306 is larger than the limiting value; a D flip-flop 309 for recording and producing the output signal of limiter 307 by responding to clock signal S1CK; a D flip-flop 310 for recording and producing the output signal of limiter 308 by responding to clock signal S2CK; a multiplexer 311 for selectively outputting the output signals of D flip-flops 309 or 310 by responding to clock signal S1CK; and a D flip-flop 312 for recording and producing the output signal of multiplexer 311 by responding to clock signal CK.

Figure 8:
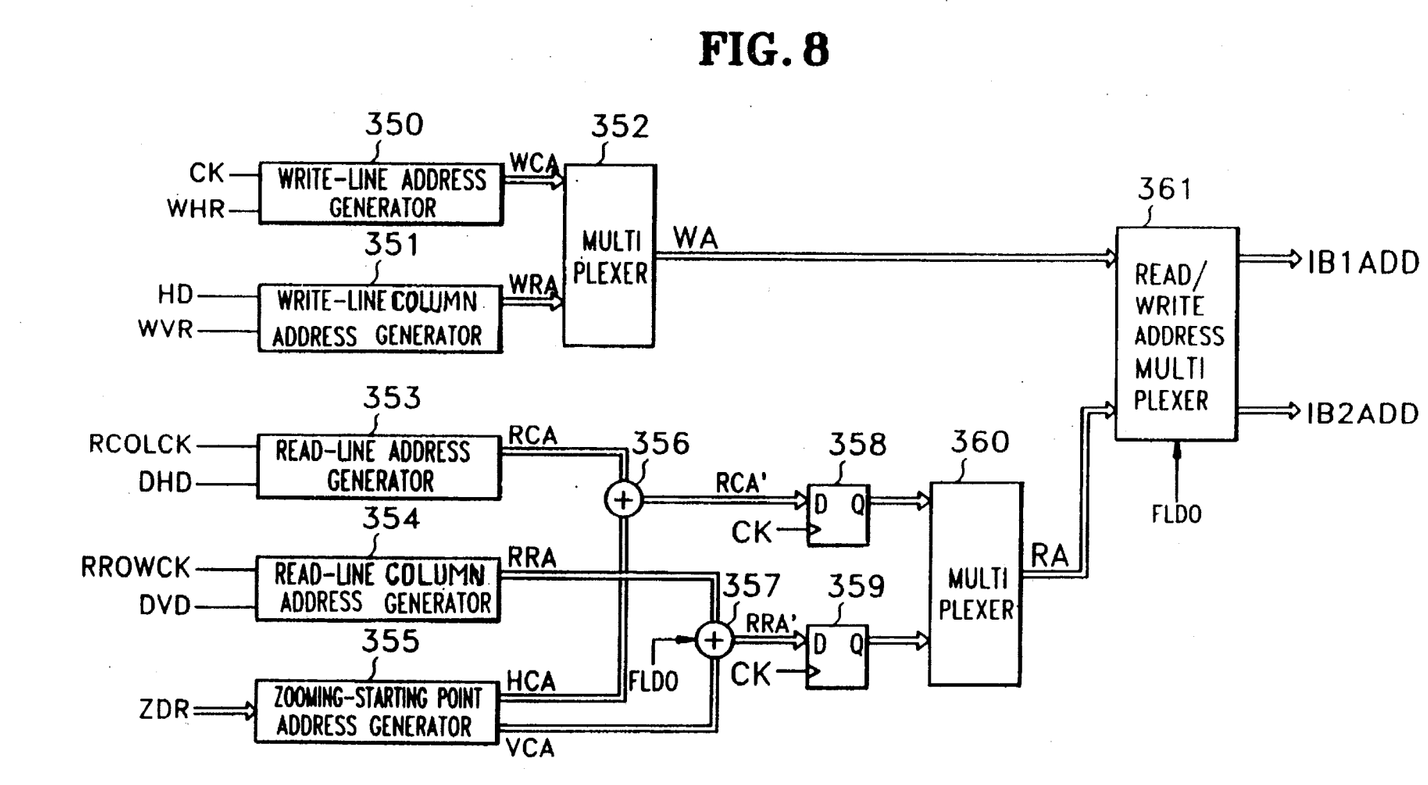
FIG. 8 is a block diagram illustrating an embodiment of the address generating means shown in FIG. 1.

FIG. 8 shows the structure of the address generating means 13 shown in FIG. 1. Relating to FIG. 8, write-line address generator 350 is for responding to clock signal CK and thereby generating the write-line address, and is reset by the control signal WHR. Write-column address generator 351 is for responding to a signal HD and thereby generating write-column address. A multiplexer 352 selectively outputs the write-line address or write-column address. A read-line address generator 353 responds to a read-line address clock signal RCOLCK and thereby generates a read-line address. A read-column address generator 354 responds to read-column address clock signal RROWCK and thereby generates a read-column address. A zooming-start address generator 355 generates the address of the zooming starting point, which is a horizontal-compensation address HCA. An adder 356 adds the output of read-line address generator 353 to the output of the zooming-start address generator 355, so as to produce a signal RCA'. D flip-flop 358 records and produces signal RCA' by responding to clock signal CK. An adder 357 adds the output of read-line address generator 354 to the vertical-compensation address VCA generated by the zooming-start address generator 355 and thereby produces a signal RRA'. D flip-flop 359 records and produces signal RRA' by responding to clock signal CK. The output signal of D flip-flops 358 and 359 are input to a multiplexer 360 which produces a final read-address RA. A multiplexer 361 selectively outputs write-address WA or read-address RA by responding to the signal FLD0.

Figure 9A:
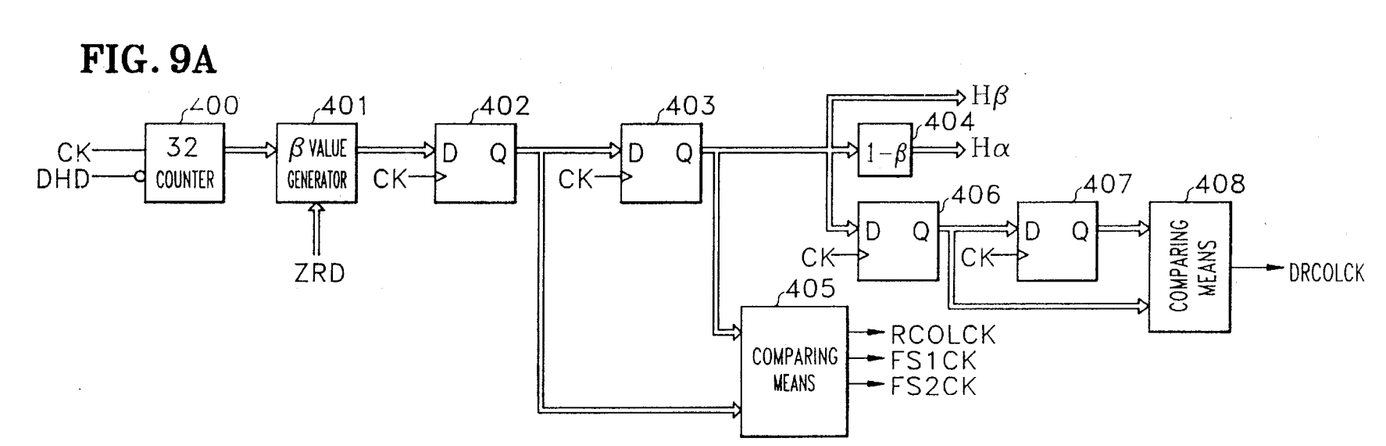
FIGS. 9A and 9B are block diagrams illustrating an embodiment of the coefficient generating means as shown in FIG. 1.
Figure 9B:
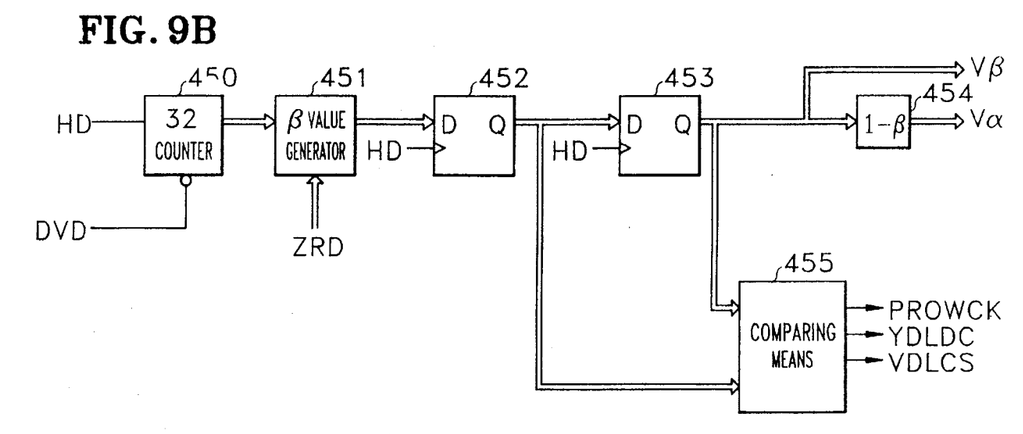

FIGS. 9A and 9B show an embodiment of the coefficient generating means 14 shown in FIG. 1.

FIG. 9A shows a circuit for generating the coefficient received and used by the sum-value horizontal interpolation means 7 and the difference-value horizontal interpolation means 9. Relating to FIG. 9A, the coefficient generating circuit 14 comprises 32-counting means 400 which is enabled by the signal DHD and counting clock signal CK; β-value generating means 401 for receiving the output signal of counting means 400 and then generating β-value according to the zooming ratio data ZRD; D flip-flops 402 and 403 for recording and outputting the β-value by responding to clock signal CK; 1–β value generating means 404 for receiving the β value from D flip-flop 403 and generating the value of α (α=1–β); D flip-flops 406 and 407 for recording and outputting the β-value by responding to clock signal CK; comparing means 408 for comparing the output signals of D flip-flops 406 and 407 and producing a delayed line-address clock signal DRCOLCK; and comparing means 405 for receiving and comparing the output signals of D flip-flops 402 and 403 and thus producing signals RCOLCK, FS1CK and FS2CK.

FIG. 9B shows a circuit for producing the coefficient input to the sum-value vertical interpolation means 8. Relating to FIG. 9B, the circuit comprises 32-counting means 450 which is enabled by a signal DVD and counting signal HD; β-value generating means 451 for receiving the output signal of counting means 450 and producing the β-value according to the zooming ratio; D flip-flops 452 and 453 for recording and producing the β-value by responding to signal HD; α-value generating means 454 for receiving the output signal, i.e., β-value, from D flip-flop 453 and then producing the α value; and comparing means 455 for comparing the output signals of D flip-flops 452 and 453 and then producing the signals RROWCK, YDLDC and DVLCS.

Figure 10:
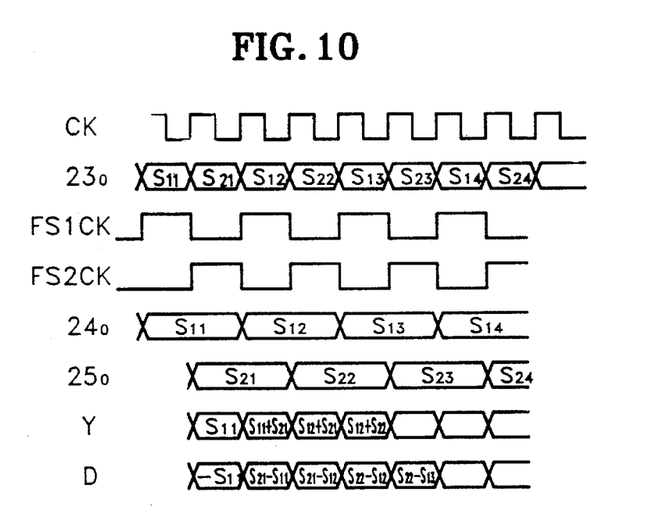
FIG. 10 is a timing diagram for illustrating the operation of the sum/difference signal separating means.

FIG. 10 is an operation timing diagram showing the operation of the sum/difference signal separating means 5 of FIG. 2. Although not illustrated in the drawings, the first picture signal recording means (FIG. 1) comprises video signal recording means for recording the even-field images IB1 and the second video signal recording means for recording the odd-field images IB2.

Table 1 classifies how the picture signal recording means operates.

TABLE 1

| FLD | FLD0 | IB1WE | IB2WE |
|---|---|---|---|
| HIGH (ODD FIELD) | LOW | LOW | HIGH |
| LOW (EVEN FIELD) | HIGH | HIGH | LOW |

In Table 1, when field signal FLD falls to a logic "low," the field output signal FLD0 is high and picture signal recording means IB1 and IB2 are high and low, respectively. Also, when field signal FLD goes high, the field output signal FLD0 is low and picture signal recording means IB1 and IB2 are low and high, respectively. Relating to Table 1, the low logic level denotes a write-mode and the high logic level denotes a read-mode. The picture signal recording means IB1 and IB2 cannot simultaneously operate in the same mode, but alternate their respective operations between the write-mode and read-mode. Accordingly, the data output from D flip-flop 23 is in the sequence $23_0$ of FIG. 10. Also, the outputs from D flip-flops 24 and 25 are in the sequences $24_0$ and $25_0$ of FIG. 10, by responding to control signals FS1CK and FS2CK, respectively. Relating to FIG. 2, an add operation is performed through adders 26, 27 and 28 and inverting means 28, so as to produce sum signal Y and difference signal D. Here, a predetermined number n is added to avoid the occurrence of negative values when calculating difference signal D.

Figure 11:
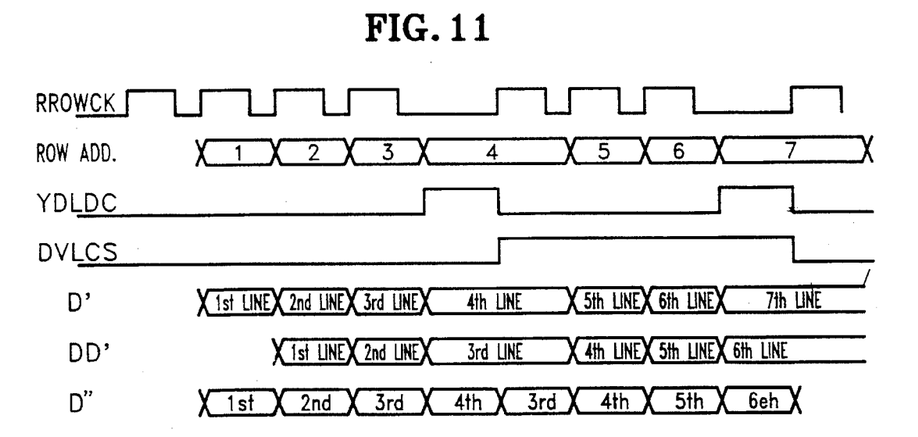
FIG. 11 is a timing diagram for illustrating the operation of the difference-value vertical interpolation means.

FIG. 11 shows an operational timing diagram for illustrating the operation of the difference-value vertical interpolation means 10, where the zooming ratio data is eight. Output signals D' and D" of difference-value horizontal interpolation means 9 (FIG. 1) are selected according to signal DVLCS, thereby avoiding the color degradation between lines caused by the NNI operation being performed to difference signal D. Referring to FIG. 11, when the signal DVLCS is low, output signal D' is selected, and when the signal DVLCS is high, output signal DD' is selected.

Using the values of Hαs and Hβs of FIG. 3, the interpolated values of X (between points A and B) are tabulated in Table 2.

TABLE 2

| Hα5 | Hα4 | Hα3 | Hα2 | Hα1 | Hα0 | Hβ4 | Hβ3 | Hβ2 | Hβ1 | Hβ0 | X |
|---|---|---|---|---|---|---|---|---|---|---|---|
| 1 | 0 | 0 | 0 | 0 | 0 | 0 | 0 | 0 | 0 | 0 | 32/32B |
| 0 | 1 | 1 | 1 | 1 | 1 | 0 | 0 | 0 | 0 | 1 | 1/32A + 31/32B |
| 0 | 1 | 1 | 1 | 1 | 0 | 0 | 0 | 0 | 1 | 0 | 2/32A + 30/32B |
| 0 | 1 | 1 | 1 | 0 | 1 | 0 | 0 | 0 | 1 | 1 | 3/32A + 29/32B |
| . | | | | | | | | | | | . |
| . | | | | | | | | | | | . |
| 0 | 0 | 0 | 0 | 1 | 1 | 1 | 1 | 1 | 1 | 1 | 31/32A + 1/32B |

Referring to Table 2, it should be noted that the pixel value of any point X between two pixels is determined according to the logic level of the coefficients generated by the coefficient generating means.

Table 3 shows the values for β according to zooming ratios.

TABLE 3

| ZRD | | | | β(/32) | | | | | | | | | |
|---|---|---|---|---|---|---|---|---|---|---|---|---|---|
| 0 | 0 | 0 | 0 | 0 | 0 | 0 | 0 | 0 | 0 | 0 | ... | 0 | 0 |
| 0 | 0 | 0 | 0 | 1 | 0 | 1 | 2 | 3 | 4 | 5 | | 30 | 31 |
| 0 | 0 | 0 | 1 | 0 | 0 | 2 | 4 | 6 | 8 | 10 | | 28 | 30 |
| 0 | 0 | 0 | 1 | 1 | 0 | 3 | 6 | 9 | 12 | 15 | | 26 | 29 |
| . | | | | | | | | | | | | | |
| 1 | 1 | 0 | 0 | 0 | 0 | 24 | 16 | 8 | 0 | 24 | ... | 8 | 0 |

As shown in Table 3, after the coefficient β is produced from vertical coefficient generating means 401, the value 1−β is calculated so as to obtain the α value. Let us assume the address and data as follows:

TABLE 4

| Address | 1 | 2 | 3 | 4 | 5 | 6 |
|---|---|---|---|---|---|---|
| Data | A | B | C | D | E | F |
| Zoomed picture | a | b | c | d | e | f | g |

Table 5 shows the coefficients and address essential for acquiring a zoomed picture having a zooming ratio of eight.

TABLE 5

| Zoomed data | Necessary data for zooming | α | β | Address |
|---|---|---|---|---|
| a | A | 32/32 | 0 | 1 |
| b | A B | 24/32 | 8/32 | 2 |
| c | B C | 16/32 | 16/32 | 3 |
| d | C D | 8/32 | 24/32 | 4 |

TABLE 5-continued

| Zoomed data | Necessary data for zooming | α | β | Address |
|---|---|---|---|---|
| e |  | D 32/32 | 0 | 4 |
| f | D | E 24/32 | 8/32 | 5 |
| g | E | F 16/32 | 16/32 | 6 |

Referring to Table 5, according to the zooming ratio data, different address forms are obtained. In comparing the address with the β value, it should be noted that, when β starts to decrease, the address remains unchanged and retains its prior value. Therefore, the read-address is determined by observing the change of the β value. The output signals from D flip-flops 402 and 403 as shown in FIG. 9A are compared in comparing means 405, and if the output signal of D flip-flop 403 is greater than or equal to that of D flip-flop 402, read-line address clock signal RCOLCK is produced. Otherwise, signal RCOLCK is not produced.

Delayed line address clock signal DRCOLCK is in the same form as that of read-line address clock signal RCOLCK, but is slightly delayed. The delayed signal is necessary because signal RCOLCK is used for address generation for reading the video data from picture signal recording means 6, but the delayed line address clock signal DRCOLCK is used after the signals S1 and S2 have been used for producing the sum and difference signals.

Also, the digital zooming system according to the present invention produces the signals WVR and DVD (FIG. 8) separately so that operation in both NTSC and PAL modes is possible. Signal WVR enables the write-column address and is generated at the leading edge of horizontal delay HD as follows:

9HD: NTSC-Hi
10HD: NTSCoNormal
16HD: PAL-Normal/Hi

Signal DVD enables read-column address and is generated at the leading edge of horizontal signal HD as follows:

HD: NTSC-Hi
8HD: NTSC-Normal
14HD: PAL-Normal/Hi

Signal WHR enables write-line address and is generated at the trailing edge of clock signal CK as follows:

17CK: NTSC-Normal
24CK: NTSC-Hi; PAL-Normal/Hi

Signal DHD enables read-line address and is generated at the trailing edge of clock signal CK as follows:

1CK: NTSC-Normal
8CK: NTSC-Hi; PAL-Normal/Hi

Accordingly, the present invention provides a digital zooming system, having the following advantages: (1) it can be used for a variety of magnification factors; (2) the interpolation method of the present invention does not use multipliers as does the conventional interpolation method, and instead adopts adders, D flip-flops and AND gates, so that a more efficient hardware construction is achieved; (3) digital zooming is achieved with high picture quality; (4) it can be used for both NTSC and PAL systems; and (5) it can be applied to any system utilizing a digital zooming function.

In FIG. 2, CCD signals S1 and S2 are converted into sum signal Y and difference signal D, so as to be interpolated in the sum signal horizontal interpolation means 7 and difference signal horizontal interpolation means 9, respectively. Signals S1 and S2 are composed of eight bits, respectively. However, signal Y is extended into nine bits by the summation in equation (1). Also, signal D is processed into nine bits by adding a number n to an 8-bit signal in adder 27.

In FIG. 3, a horizontal interpolation with respect to adjacent pixels A and B is performed as in the equation $Y'=H\alpha A+H\beta B$. As expressed in this equation, two multipliers are necessary. However, the present invention does not use any multipliers. Instead, an adder is used which performs a bit-shift-right function of data to obtain the effect of a multiplier. Referring to Table 2, the right-shifted data is selectively added in the adder when the values of Hα and Hβ are 1, respectively. As a result, a horizontal interpolated result Y' is obtained. On the other hand, inputs of multiplexer 65 is composed of ten bits, which are virtually extended to match a signal path since the other signal line adders 70, 71, 75 and 76 have decimal point data. That is, referring to FIG. 3, the data of signal Y input according to a clock DRCLOCK is held in D flip-flops 50, 51 for the horizontal interpolation and the right-shifted data of the held data is selected in the AND gates according to the coefficients Hα and Hβ. Then, D flip-flops 64, 77 output data multiplied by the coefficients according to the system clock CK, and D flip-flop 79 outputs a finally interpolated signal Y'. An output signal DY' in FIG. 3 is a signal which is obtained by delaying the horizontal interpolated data by one horizontal period for a vertical interpolation.

All the adders and AND gates which are used in the interpolation operation have the same construction and operate as described above. Moreover, all adders shown in FIG. 3 have the same construction and are not controlled by direct input clock pulses. Instead, the adders perform summing operations under the valid clock timing of the clock pulses of the main clock upon receipt of two inputs in which one is an output of D flip-flop 51 and the other is a coefficient. Interpolation means blocks 7-8 in FIG. 1 are shown in detail in FIGS. 3 and 4. The present invention adopts an interpolation process different from the prior art. For instance, the charge-coupled device signal is different from the television signal in view of the adjacent pixels and lines of a video signal.

In FIG. 4, a vertical interpolation is performed using output signals Y' and DY' of FIG. 3. A vertically interpolated signal Y" is obtained by interpolating the input data every clock pulse according to vertical coefficients Vα and Vβ in a similar way to the horizontal interpolation process.

The FIG. 5 apparatus has the same construction as that of FIG. 3 and uses difference signal D, not sum signal Y. The FIG. 6 apparatus vertically interpolates horizontally interpolated D' and one horizontally delayed signal DD' according to the timing diagram of FIG. 11.

All the adders shown in FIGS. 3 to 6 directly add the data output from the AND gates according to the main clock of the D flip-flop since the clock timing thereof is still valid.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A digital zooming system for zooming a CCD video signal comprising:

recording means for recording a first charge-coupled device format digital video signal representing a color array converted into digital form and having a predetermined color order;

sum/difference signal separating means for receiving said first charge-coupled device format digital video signal and for obtaining a sum value and a difference value of two neighboring pixels among a plurality of pixels which establish said predetermined color array;

interpolation calculating means comprising:
sum-value interpolation calculating means for calculating a linear horizontal interpolation and a linear vertical interpolation with respect to said sum value according to a zooming factor, and
difference-value interpolation calculating means for calculating a linear horizontal interpolation and a nearest-neighbor vertical interpolation with respect to said difference value according to said zooming factor;

sum/difference signal mixing means for receiving resulting signals from said sum-value interpolation calculating means and said difference-value interpolation calculating means, and for producing a second charge-coupled device format digital video signal;

digital-to-analog converting means for converting said second charge-coupled device format digital video signal from said sum/difference signal mixing means into an analog television signal form having a color array in said predetermined order;

address generating means for producing a read-address signal for reading and a write-address signal for recording data in said recording means; and coefficient generating means for producing and sending coefficients corresponding to said zooming factor to said interpolation calculating means.

2. The digital zooming system as claimed in claim 1, wherein said sum/difference signal mixing means comprises:

a first adder for summing first and second color array data; and a second adder for subtracting said first color array data from said second color array data;

said first and second color array data being arranged according to said predetermined order.

3. The digital zooming system as claimed in claim 2, wherein said second adder adds a predetermined number to a result thereof to avoid a negative value in said result.

4. The digital zooming system as claimed in claim 1, wherein said sum-value interpolation calculating means comprises:

first interpolation calculating means for calculating said linear horizontal interpolation with respect to said sum value; and second interpolation calculating means for receiving an output signal from said first interpolation calculating means and for calculating said linear vertical interpolation with respect to said sum value.

5. The digital zooming system as claimed in claim 4, wherein:

said two neighboring pixels comprise a first pixel and a second pixel; and said first interpolation calculating means comprises means for calculating a sum horizontal interpolation result by adding a first value obtained by multiplying a value of said first pixel by a horizontal distance between an arbitrary point and said second pixel, to a second value obtained by multiplying a value of said second pixel by a horizontal distance between said arbitrary point and said first pixel.

6. The digital zooming system as claimed in claim 5, wherein said first interpolation calculating means further comprises a delay circuit for delaying said sum horizontal interpolation result for one horizontal scanning period.

7. The digital zooming system as claimed in claim 4, wherein:

said two neighboring pixels comprise a first pixel and a second pixel; and said second interpolation calculating means comprises means for calculating a sum vertical interpolation result by adding a first value obtained by multiplying a value of said first pixel by a vertical distance between an arbitrary point and said second pixel, to a second value obtained by multiplying a value of said second pixel by a vertical distance between said arbitrary point and said first pixel.

8. The digital zooming system as claimed in claim 1, wherein said difference-value signal interpolation calculating means comprises:

third interpolation calculating means for calculating said linear horizontal interpolation with respect to said difference value;

fourth interpolation calculating means for calculating said nearest-neighbor vertical interpolation with respect to a result of said third interpolation calculating means; and a digital filter circuit for filtering an output signal from said fourth interpolation calculating means.

9. The digital zooming system as claimed in claim 8, wherein:

said two neighboring pixels comprise a first pixel and a second pixel; and said third interpolation calculating means comprises means for calculating a difference horizontal interpolation result by adding a first value obtained by multiplying a value of said first pixel by a horizontal distance between an arbitrary point and said second pixel, to a second value obtained by multiplying a value of said second pixel by a horizontal distance between said arbitrary point and said first pixel.

10. The digital zooming system as claimed in claim 9, wherein said third interpolation calculating means further comprises a delay circuit for delaying said difference horizontal interpolation result for one horizontal scanning period.

11. The digital zooming system as claimed in claim 10, wherein said fourth interpolation calculating means comprises selecting means for selectively outputting an output signal from said third interpolation calculating means and an output of said delayed signal from said third interpolation calculating means.

12. The digital zooming system as claimed in claim 8, wherein said digital filter circuit satisfies the following characteristic equation:

$$H(z) = \frac{0.75 + 0.5z^{-1} + 0.75z^{-2}}{2}$$

13. The digital zooming system as claimed in claim 1, wherein said address generating means comprises:

write-address generating means for generating said write-address signal; and read-address generating means for generating said read-address signal;

wherein said address generating means selectively produces said write-address signal and said read-address signal.

14. The digital zooming system as claimed in claim 1, wherein said coefficient generating means comprises:

counting means for counting a predetermined number of sections constituting a distance between said two neighboring pixels, said distance between said two neighboring pixels being set to one;

sum-value coefficient generating means comprising:

first horizontal-direction coefficient generating means for receiving an output signal of said counting means having said predetermined number of intervals and said zooming factor so as to obtain a horizontal distance between an arbitrary point and said first pixel, and second horizontal-direction coefficient generating means for subtracting said first horizontal-direction coefficient from one so as to calculate a horizontal distance between said arbitrary point and said second pixel; and difference-value coefficient generating means comprising:

first vertical-direction coefficient generating means for receiving said output signal of said counting means having said predetermined number of intervals and said zooming factor so as to obtain a vertical distance between said arbitrary point and said first pixel, and second vertical-direction coefficient generating means for subtracting said first vertical-direction coefficient from one so as to calculate a vertical distance between said arbitrary point and said second pixel.

15. The digital zooming system as claimed in claim 1, wherein said sum/difference signal mixing means comprises:

a first adder for receiving said resulting signal from said sum-value interpolation calculating means and adding a predetermined number thereto;

a second adder for adding said resulting signal from said difference-value interpolation calculating means to said resulting signal from said sum-value interpolation calculating means;

a third adder for subtracting a resulting signal from said difference-value interpolation signal divided by two, from a result of said first adder divided by two;

a fourth adder for subtracting said predetermined number divided by two, from a result of said second adder divided by two; and selection means for selectively outputting output signals of said third adder and said fourth adder.

* * * * *